(12) United States Patent
Mills et al.

(10) Patent No.: US 7,611,769 B2
(45) Date of Patent: Nov. 3, 2009

(54) RESILIENT PRODUCT

(75) Inventors: Norman Mills, Beaconsfield (AU); Steven Geoffrey Rickard, Kilda (AU)

(73) Assignee: Boss Polymer Technologies Pty Ltd, Mulgrave, Victoria (AU)

( * ) Notice: Subject to any disclaimer, the term of this patent is extended or adjusted under 35 U.S.C. 154(b) by 295 days.

(21) Appl. No.: 10/487,585

(22) PCT Filed: Jun. 24, 2002

(86) PCT No.: PCT/AU02/00818

§ 371 (c)(1),
(2), (4) Date: Aug. 19, 2004

(87) PCT Pub. No.: WO03/018308

PCT Pub. Date: Mar. 6, 2003

(65) Prior Publication Data

US 2004/0258895 A1  Dec. 23, 2004

(30) Foreign Application Priority Data

Aug. 28, 2001  (AU) .................................. PR7306

(51) Int. Cl.
*B32B 7/02* (2006.01)
(52) U.S. Cl. .................. 428/216; 428/40.1; 428/195.1; 428/217; 428/343; 428/354; 264/239; 264/241; 264/248; 264/250; 264/259; 264/500; 264/510
(58) Field of Classification Search ............... 428/40.1, 428/195.1, 216, 217, 343, 354; 264/239, 264/241, 248, 250, 259, 500, 510
See application file for complete search history.

(56) References Cited

U.S. PATENT DOCUMENTS

| 4,084,348 A | * | 4/1978 | Hast .......................... 49/475.1 |
| 4,273,827 A | * | 6/1981 | Sweeney et al. ......... 428/316.6 |
| 4,505,960 A | | 3/1985 | Leffingwell |
| 4,537,825 A | | 8/1985 | Yardley |
| 4,902,480 A | * | 2/1990 | Keys ....................... 428/296.4 |

(Continued)

FOREIGN PATENT DOCUMENTS

EP  0 357 973 A1  3/1990

(Continued)

OTHER PUBLICATIONS

"section." Merriam-Webster Collegiate Dictionary 1056 (10th ed. 1996), available at http://www.merriam-webster.com/dictionary/section.*

(Continued)

*Primary Examiner*—Bruce H Hess
*Assistant Examiner*—David J Joy
(74) *Attorney, Agent, or Firm*—Brooks Kushman P.C.

(57) ABSTRACT

This invention relates to resilient product including a relatively soft workding section (2) secured to a surface of a relatively hard interlayer (4). An opposed surface of the interlayer (4) includes a mounting section (3) which functions to secure the resilient product to a support. The resilient product is particularly suitable for providing a sealing member or a resilient mounting member. The ability of the resilient product to be secured to a support, and remain secured to that support is a particular advantage.

27 Claims, 4 Drawing Sheets

U.S. PATENT DOCUMENTS

| | | | |
|---|---|---|---|
| 5,067,290 A * | 11/1991 | Kuroda et al. | 52/208 |
| 5,297,842 A * | 3/1994 | Hayashi | 296/146.7 |
| 5,304,409 A * | 4/1994 | Nozaki | 428/122 |
| 5,456,513 A | 10/1995 | Schmidt | |
| 5,562,961 A * | 10/1996 | Buchholz et al. | 428/36.5 |
| 5,582,895 A | 12/1996 | Dupuy et al. | |
| 5,693,419 A * | 12/1997 | Nozaki | 428/354 |
| 6,287,685 B1 * | 9/2001 | Janssen et al. | 428/353 |
| 6,365,254 B1 * | 4/2002 | Zoller et al. | 428/40.1 |

FOREIGN PATENT DOCUMENTS

| | | |
|---|---|---|
| EP | 0 392 090 A2 | 10/1990 |
| GB | 2 036 840 A | 7/1990 |
| JP | 50-71246 | 6/1975 |
| JP | 52-093453 | 8/1977 |
| JP | 2-122050 | 4/1990 |
| JP | 02-27416 | 11/1990 |
| JP | 05-247413 | 9/1993 |
| JP | 06-091795 | 4/1994 |
| JP | 07-026214 | 1/1995 |
| JP | 07-290604 | 11/1995 |

OTHER PUBLICATIONS

"part." Merriam-Webster Collegiate Dictionary 846 (10th ed. 1996), available at http://www.merriam-webster.com/dictionary/part.*

* cited by examiner

RESILIENT PRODUCT

CROSS-REFERENCE TO RELATED APPLICATIONS

This application is the National Stage of International Application No. PCT/AU02/00818 filed Jun. 28, 2002, which claimed priority to Australian Patent Application No. PR 7306, filed Aug. 28, 2001.

BACKGROUND OF THE INVENTION

1. Field of the Invention

This invention relates to a resilient product adapted to be attached to a support so as to, for example, function as a sealing member. In another example the resilient product may function as a resilient mounting member It will be convenient to hereinafter describe the invention with particular reference to sealing members, but it is to be understood that the invention has wider application including the resilient mounting member example.

2. Background Art

A resilient product according to the invention is especially, but not exclusively, useful in providing a weather or dust seal for vehicle doors and other movable members. Vehicle door seals typically include a length of extruded rubber or other resilient material that is secured to the door and/or the frame surrounding the door opening. Such seals are commonly attached to the door or the frame by means of clips, or other fastening devices. The need for such fastening devices adds to the cost of the seal, and also adds to the time required (and consequent cost) to attach the seal to its support.

In relatively recent times it has been proposed to attach a resilient seal to a vehicle door or frame by means of a double sided adhesive tape. That technique has not been satisfactory because of a tendency of the resilient seal member to separate from the adhesive tape.

SUMMARY OF THE INVENTION

It is an object of the present invention to provide a resilient product that can be satisfactorily attached to a support by means of an adhesive. It is a further object of the invention to provide an improved method of manufacturing a resilient product, such as (by way of example) a sealing member. Yet another object of the invention is to provide a resilient sealing member having a surface thereof formed at least in part of a pressure sensitive adhesive whereby the member is able to be secured to a support. It is a still further object of the invention to provide a method of manufacturing such a sealing member. Another object of the invention is to provide an improved seal for vehicle doors. Another object of the invention is to provide an improved resilient mounting member.

A resilient product according to the invention includes a resilient product including a working section formed of a relatively soft elastomeric material, a mounting section having an adhesive surface for securing the working section to a support, and an interlayer formed of a relatively hard material interposed between the working section and the mounting section and being secured to both said working section and said mounting section and a cap section associated with the working section, the cap section being harder than the working section.

In an example product suitable for use as a vehicle door seal, the working section is formed of Santoprene rubber, or a material of similar softness, and the interlayer is formed of polypropylene, or a material of similar hardness.

The interlayer may be attached to the working section by any suitable process, such as fusion (one form of which is welding), and the mounting section may be attached to the interlayer by adhesion. Alternative to forming the interlayer separate from the working section, it may be created by treating a surface of the working section to transform that surface into a relatively hard layer whilst leaving the remainder of the working section in a relatively soft state, which may be the soft state initially possessed by the working section. The mounting section is preferably a double sided adhesive strip or layer having a release liner of suitable material over the adhesive surface remote from the interlayer.

In circumstances where the mounting section is a double sided adhesive tape, it is preferred that the stretchability (elasticity) of the tape is substantially the same as that of the interlayer. If there is a difference, it is preferable that the elasticity of the tape is greater than that of the interlayer. The working section however, which may be an extruded section or profile of Santoprene rubber for example, will usually have greater flexibility and elasticity than both the mounting section and the interlayer.

The interlayer may be formed of a sheet or strip of polypropylene, or other suitable material, and may be combined with the adhesive tape prior to being connected to the working section. In those circumstances, it will usually be the case that the interlayer/tape composite will be stored in roll form with the tape outermost to facilitate subsequent connection to the working section. A release liner of paper, plastic, or other suitable material, will remain over and protect the outer adhesive surface of the tape until the resilient product is being made ready for attachment to a support.

It is preferred that the two opposite surfaces of the liner are subjected to differential surface treatment prior to that liner being applied to the adhesive surface of the tape. That differential treatment is designed to ensure that the liner remains in place on the adhesive tape as the tape is being unwound from the stored condition.

According to another aspect of the invention there is provided a method of producing a resilient product including the following steps:

bringing an adhesive surface of a mounting section into engagement with once surface of a relatively hard interlayer, securing the mounting section to the interlayer by adhesion to form a composite, applying a compressional force to said mounting section interlayer composite, feeding the mounting section interlayer composite into the path of molten material intended to form a relatively soft working section, and fusing the working section to an opposed surface of the interlayer.

It will be convenient to hereinafter further describe the invention with particular reference to the accompanying drawings. It is to be understood however, that the particularity of those drawings and the associated detailed description does not supersede the generality of the preceding relatively broad description of the invention.

DETAILED DESCRIPTION OF THE PREFERRED EMBODIMENTS

Figure 1:
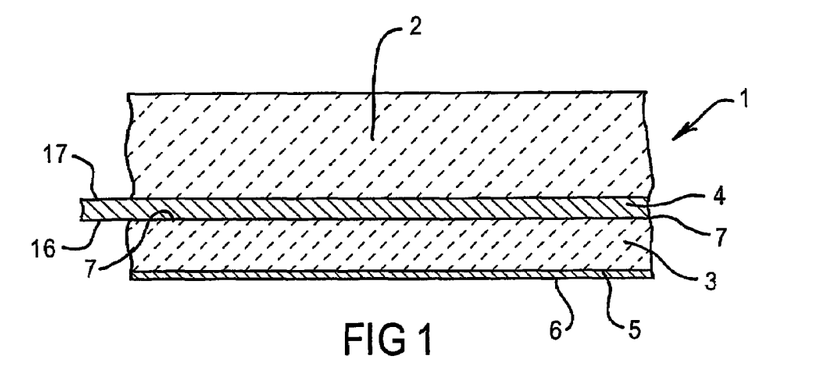
FIG. 1 is a cross-sectional view of a resilient product made in accordance with one embodiment of the present invention.

FIG. 1 is a cross-sectional view of a resilient product 1 according to one embodiment of the invention. The product 1 includes a working section 2 connected to a mounting section 3 through an interlayer 4. The mounting section 3 has an adhesive surface 5 that is protected by a suitable removable overlay 6. The relative thicknesses of the various components are not drawn to scale, and have been exaggerated for convenience of illustration.

The working section 2 is preferably formed of a relatively soft elastomeric material such as Santoprene rubber, or another suitable thermoplastic elastomer. The "relatively soft" characteristic of the material is to be understood as normally encompassing hardnesses in the range Shore A5 to Shore A90 inclusive. There may be circumstances under which the working section 2 has a hardness falling outside of that range, but in the case of a product intended for use as a sealing member (eg., for vehicle doors) the hardness will generally fall within the stated range. A material suitable for use as a sealing member will preferably be a low flexural modulus material (eg., 0.3 Mpa to 150 Mpa, inclusive, at 23° C.) that can be stretched to at least twice its original length at room temperature, and be able to return to its approximate original length when stress is removed. That is, it will generally have a high elastic memory and a recoverable elongation in the order of 200% to 1500%, inclusive. Furthermore, the material preferably exhibits very low tension or compression set during stretching or compression (eg., 10% to 40% at tensile break), and should preferably behave like rubber.

Other materials could be used for the working section 2. By way of example, a sponge rubber or a foamed elastomeric polymer (such as foamed Santoprene or PVC foam) could be used. In such cases, the material might be selected on the basis of specific gravity rather than hardness as in the previous example. Materials having specific gravity in the range 0.1 to 1.2, inclusive, could be suitable. By way of example, PVC foam having a specific gravity in the range 0.8 to 1.2 inclusive could be suitable.

The relatively hard interlayer 4 could be formed of any suitable material, including polypropylene or another polymer such as PVC. The "relatively hard" requirement will generally be satisfied if the material has a hardness in the range Rockwell R80 to Rockwell R150, inclusive, but hardnesses outside of that range may be acceptable in some circumstances. The selected material will preferably have elongation (at break) in the order of 100% to 500%, inclusive, and a flexural modulus of 130 Mpa to 1200 Mpa, inclusive, at 23° C. It is also preferred, but not essential, that the interlayer has a thickness in the range 0.3 mm to 2.0 mm, inclusive. A thickness in the range 1.0 mm to 2.0 mm is usually preferred. A thickness greater than 2.0 mm is unlikely to be used if the product 1 is intended as a sealing member, but there may be circumstances that require or enable such a large thickness.

The thickness of the interlayer 4 may be selected by reference to the configuration and/or elasticity of the working section 2. By way of example, a relatively soft unsupported working section 2 may require a thicker interlayer 4 than would be required for a relatively stiff and therefore relatively self-supporting working section 2.

The interlayer 4 may be formed by a sheet or strip of either oriented polypropylene, or biaxially oriented polypropylene. Whichever of those materials is adopted it is preferably a material having dimensional stability—eg., a maximum variation of 3% at 80° C. (AS2324-1979 appendix H). A suitable material is semi-rigid low plasticised PVC sheeting having an Elmendorf tear strength of 40 N/mm minimum, and a BSS hardness of 2+/−2 (BS.2782, method 307A).

Although the interlayer 4 is described above as being formed separate from the working section 2, it is to be understood that it may be formed by an integral surface region of the working section 2. That is, a surface of the working section 2 may be treated so as to transform the material at that surface from a relatively soft state to a relatively hard state. The treatment may be selected so as to transform the state of the material through a suitable depth below the treated surface whilst leaving the remainder of the working section 2 in its original relatively soft state, or substantially in that state.

The mounting section 3 may be of any suitable form or composition. In one arrangement, the mounting section 3 is formed of a strip or sheet having a pressure sensitive adhesive at each of two opposite surfaces 5 and 7. The strip or sheet may be composed of a suitable carrier material, such as non-woven rayon, saturated with an appropriate adhesive. Preferably, the carrier material has an ultimate elongation of 2 to 3%. A solvent acrylic type adhesive may be suitable, and particularly such an adhesive providing the section 3 with peel adhesion of approximately 7N/cm. In the final assembly as shown by FIG. 1, the outermost surface 5 of the mounting section 3 is covered by a protective and releasable layer 6 of suitable material, such as a sheet of paper or thin plastic, treated with, or including, an appropriate release agent. The arrangement is such that the protective layer 6 can be removed without disturbing the adhesive characteristics of the surface 5.

It is to be understood that the mounting section 3 could be formed in other ways. By way of example, the adhesive could be a transfer adhesive, or could be applied to the section 3 by spraying or another suitable process.

Figure 2:
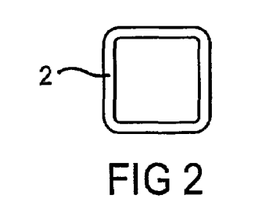
FIG. 2 is an illustration, in diagrammatic form, showing an example molded working section of rectangular frame-like form useable in connection with a resilient product made in accordance with one embodiment of the present invention.
Figure 3:
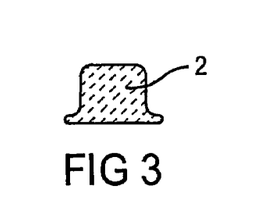
FIG. 3 is an illustration, in diagrammatic form, showing the transverse cross-sectional form of an example extruded working section useable in connection with a resilient product made in accordance with one embodiment of the present invention.

Assuming the resilient product 1 is intended to function as a sealing member, such as a seal for a vehicle door, the working section 2 could be formed by any suitable process, such as extrusion or moulding. FIG. 2 shows, in diagrammatic form, an example moulded working section 2 of rectangular frame-like form. FIG. 3 shows, again in diagrammatic, the transverse cross-sectional form of an example extruded working section 2. Both examples are shown for illustrative purposes only. In a further example (not shown), the working section 2 may be formed as a relatively broad sheet, and a moulding process or an extrusion process could be used for that purpose. The sheet so formed may be subsequently divided into strips, or sections of other shapes, as may be required.

Figure 9:
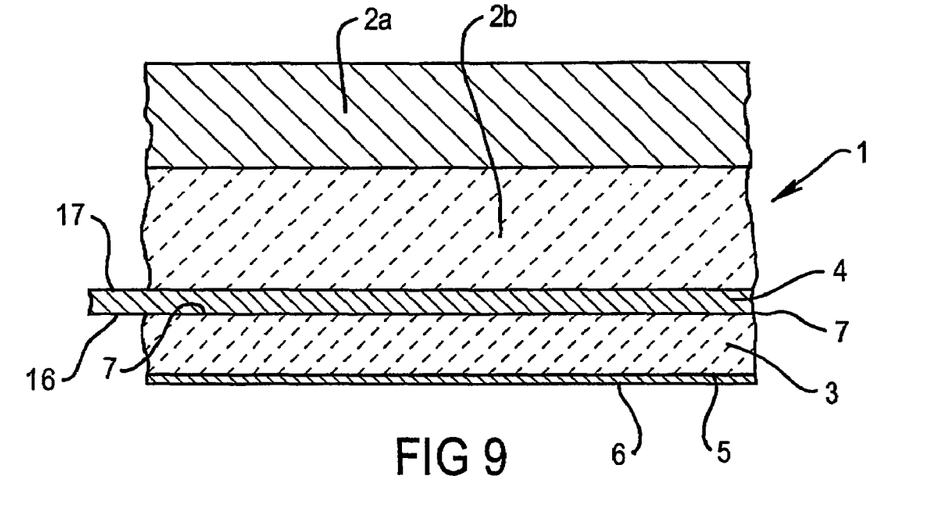
FIG. 9 illustrates one preferred embodiment of a resilient product made in accordance with one embodiment of the present invention.

FIG. 9 illustrates a preferred embodiment of the resilient product as previously described. For simplification of understanding of the illustration like features are referred to by like reference numerals from FIG. 1. The preferred embodiment illustrated in FIG. 9 includes a cap section 2a associated with the working section 2b. The cap section is formed from a material which is harder than the working section. The cap section may have a hardness greater than Rockwell R80. The cap section may also be formed separately from the working section and secured to the working section by fusion or other welding process. The cap section may be formed from any suitable material. By way of example the cap section may be formed from polypropylene, rigid PVC or other rigid thermoplastic.

Figure 10:
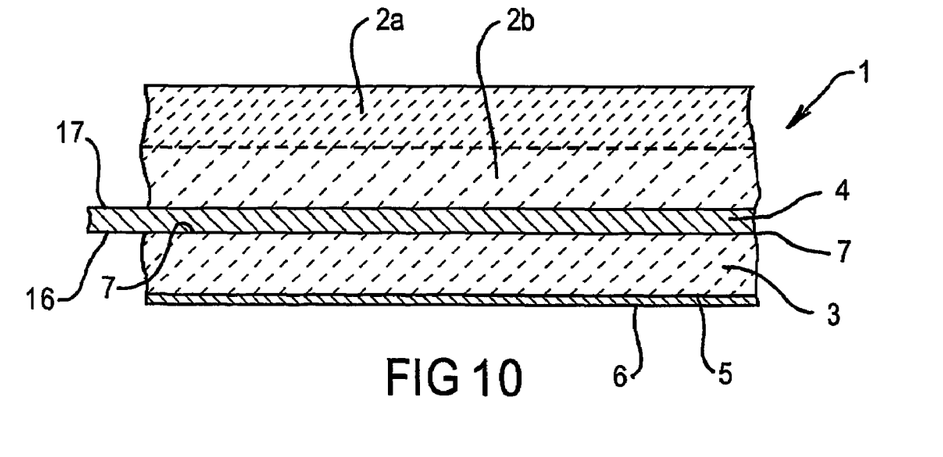
FIG. 10 illustrates another preferred embodiment a resilient product made in accordance with one embodiment of the present invention.

Referring now to FIG. 10 which illustrates a further preferred embodiment of the invention where like reference numerals refer to like features previously described. The illustrated resilient product includes a cap section 2a and a working section 2b wherein the cap section is formed integrally with the working section. The cap section and working section may be formed by any suitable process. In one example of the process a portion of the working section is treated so as to transform that portion into the relatively hard cap section 2a. In another example of the process the cap section 2a and working section 2b are co-extruded. The relative hardness of the cap section may increase throughout its depth, or may be relatively constant for the depth of the cap section.

Figure 4:
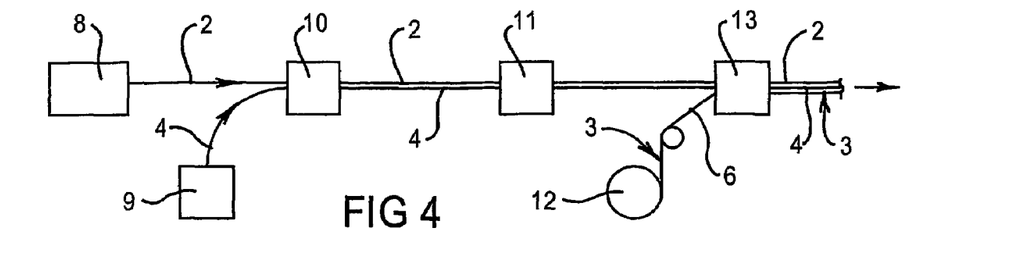
FIG. 4 is a diagrammatic illustration of an example method of manufacturing a resilient product made in accordance with the present invention.

FIG. 4 is a diagrammatic illustration of an example method of manufacturing a resilient product 1 according to the present invention. In that example method, a working section 2 is produced at the station 8 by moulding, extrusion, or any other suitable process. A relatively hard interlayer 4 is moved from the station 9 so as to be placed in face to face relationship with the working section 2. The interlayer 4 and the working section 2 are connected together at the station 10 by any suitable means. By way of example, the interlayer 4 and the working section 2 may be connected by a melt adherence (welding) process. A first composite 2,4 is thereby produced.

It may be necessary to treat the exposed surface of the interlayer 4 to enable, or assist, a connection to be made with a mounting section 3 as previously described. Assuming the interlayer 4 is formed of a polypropylene, the exposed surface might be treated by corona discharge at the station 11. It is to be understood however, that other types of surface treatment (eg., etching, blue flaming, or chemical treatment) could be adopted to condition the interlayer 4 so as to promote an adhesive connection with the mounting section 3. Whatever the nature of the surface treatment, it is preferred that the treated surface has surface adhesion in the range 34 to 42 Dyne, inclusive (eg., 38 Dyne). The mounting section 3 may be stored in the form of a roll 12, and is unwound from the roll 12 as it is moved into station 13 to be combined with the composite 2,4. Preferably, a protective release liner 6 is provided over one surface only of the tape 3, which is the outside surface 5 (FIG. 1). The differential treatment to opposite surfaces of the liner 6 as previously described ensures that only one of those opposite surfaces separates from the adhesive tape 3 as the tape 3 is being unwound from the roll 12.

It is preferred that the adhesive tape 3 is connected to the composite 2,4 under controlled conditions. By way of example, conditions such as temperature, pressure of application, and exposure to dust, may be controlled to maximise the strength of adhesion between the two bodies.

Figure 5:
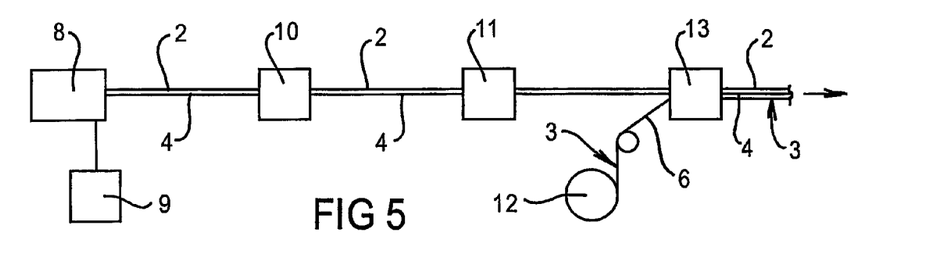
FIG. 5 is an illustration of a variation of the FIG. 4 arrangement involving the use of cross-head extrusion.

FIG. 5 illustrates a variation of the FIG. 4 arrangement involving the use of cross-head extrusion. In the FIG. 5 arrangement, the interlayer 4 is fed into the path of the molten material intended to form the working section 2, and emerges from the station 8 in face to face relationship with the working section 2. The working section 2 and the interlayer 4 may be connected together (eg., by melt adherence) while at the station 8. Alternatively, that connection could occur, or be enhanced, at the station 10 as previously described. In all other respects, the method of FIG. 5 may be generally in accordance with the method of FIG. 4.

Figure 6:
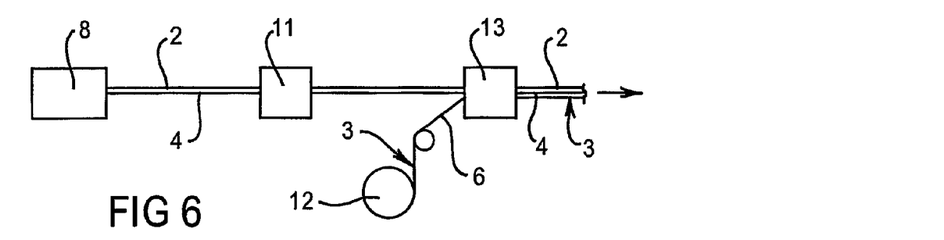
FIG. 6 illustrates another example method in which the working section and the interlayer of the product may be coextruded.

FIG. 6 illustrates another example method in which the working section 2 and the interlayer 4 are co-extruded at the station 8. The succeeding steps of the method may be as described above in connection with FIG. 4. In a variation of the FIG. 6 method, the mounting section 3 may be applied to the interlayer 4 at station 8. In such a method, the final product 1 will emerge from the station 8, and the stations 11 and 13 will not be required.

Figure 7:
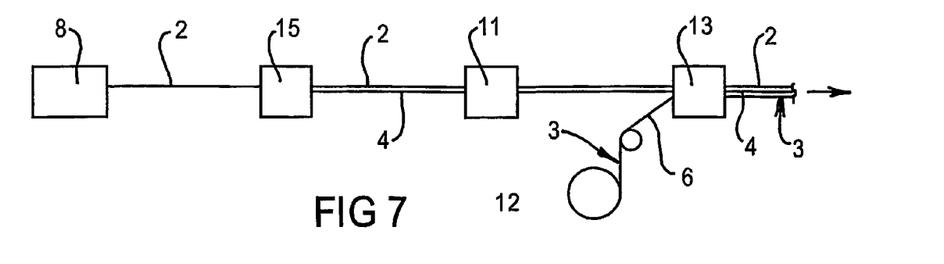
FIG. 7 illustrates another example method in which the working section is past to a treatment station.

FIG. 7 illustrates yet another example method in which the working section 2 (however formed) is passed to a treatment station 15 at which a surface region of the section 2 is transformed into a relatively hard state, as previously described. The resulting composite 2,4 may then be passed through successive method steps as described in relation to FIG. 4.

Figure 8:
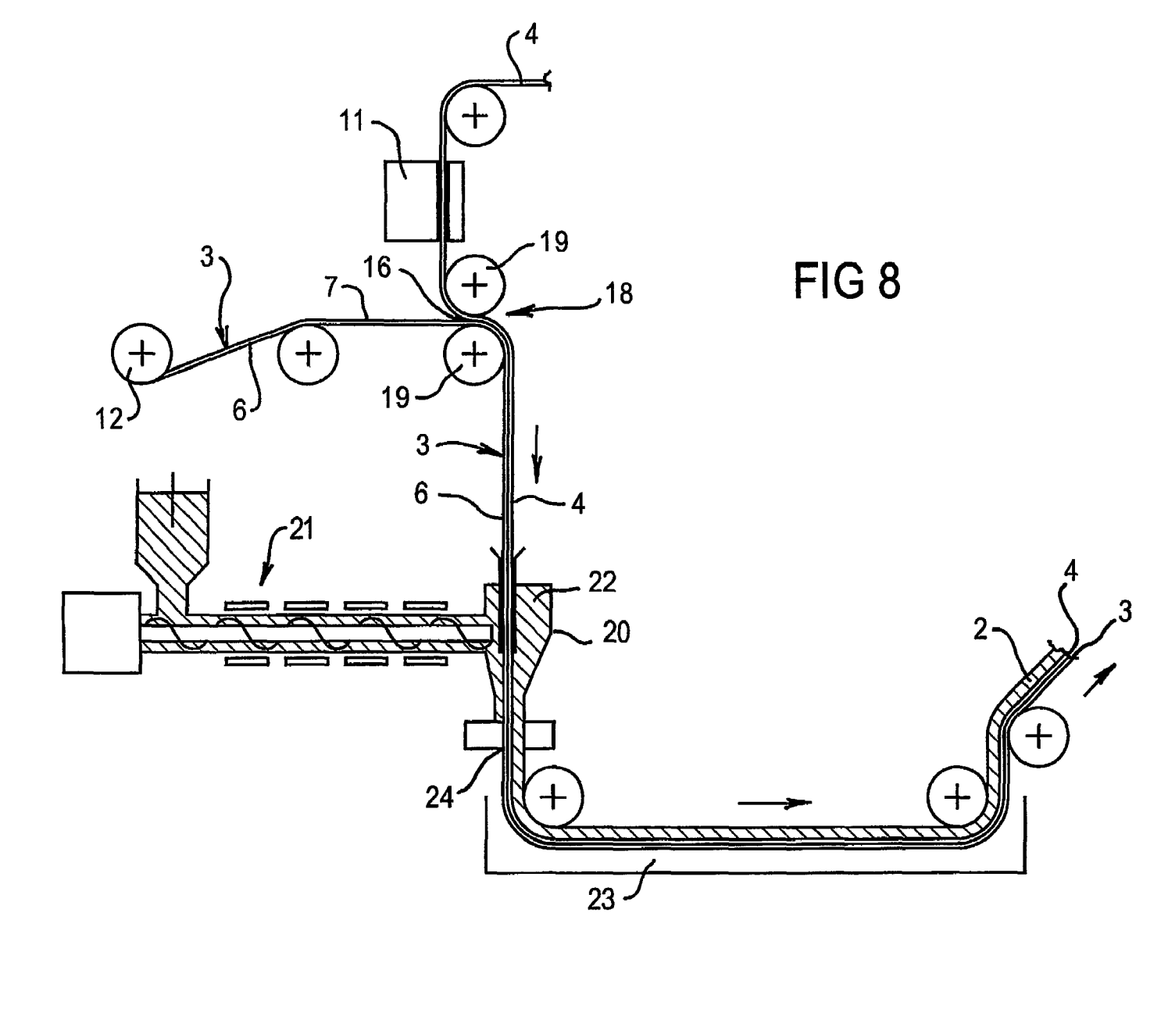
FIG. 8 illustrates another example method which involves cross-head extrusion.

Still another example method is shown by FIG. 8 which involves cross-head extrusion as briefly discussed above in connection with FIG. 5. In the FIG. 8 arrangement the double sided adhesive tape 3 is fed through a pressing station 18 including at least one pair of nip rolls 19. The interlayer 4 is also fed through the station 18 so as to overly and engage the adhesive surface 7 of the tape 3. Prior to entering the station 18, the interlayer 4 may be passed through a treatment station 11 at which at least the surface at the interface 16 is treated by corona discharge, for example.

The tape 3 and the interlayer 4 are pressed together at the station 18 under controlled conditions including, for example, controlled pressure between the tape 3 and the interlayer 4. The process within the station 18 may be carried out at ambient temperature. It is preferred that after passing through the rolls 19 the tape/interlayer composite 3,4, is passed over or through other rolls (not shown) that are oriented or otherwise arranged to enhance the bond between the tape 3 and the interlayer 4. That may be done by a pushing, rubbing, or massaging operation. By way of example, a compressive force applied to an exposed surface of the tape and/or the interlayer 4 may be caused to travel across the exposed surface in a direction transverse to, or angularly relative to, the direction of longitudinal movement of the composite 3,4. Such treatment of the composite 3,4 may be carried out by passing the composite through a pair of contra-rotating rolls (not shown), at least one of which may have its rotational axis disposed at an angle other than 90° relative to the direction of movement of the composite 3,4.

The composite 3,4 is then passed through the head chamber 20 of an extruder 21 containing a molten body 22 of the material intended to form the working section 2. The arrangement is such that the composite 3,4 and the working section 2 are united within the chamber 20 by melt adhesion. After emerging from the chamber 20, the resulting new composite 2,3,4 is passed through a controlled temperature water bath 23 so as to cool the composite 2,3,4 and set the working section 2 at the profile or cross-sectional shape dictated by the outlet end 24 of the extruder 21.

Since the composite 3,4 is fed through the extruded chamber 20 with the protective liner 6 in place, it will usually be desirable to form that liner from a suitable material, such as a plastics material, able to withstand the temperature conditions within the chamber 20 as well as the conditions within the water bath 23. Suitable materials include polyesters, and it is preferable that the selected material is one that has a low level of elasticity and therefore resists stretching.

A resilient product 1 as described has a strong resistance to delamination of the product, particularly at the interface 16 (FIG. 1) of the interlayer 4 and the mounting section 3. That is believed to arise because the relatively hard interlayer 4 shields the interface 16 from the influence of movement occurring within the working section 2 because of compression or stretching of that section when in use (eg., as a vehicle door seal). Delamination at the interface 17 (FIG. 1) between the working section 2 and the interlayer 4 is unlikely to occur because of the very strong bond existing between those two components.

Other possibly relevant factors include:
1. The mounting section 3 (the adhesive tape) is relatively inelastic, and preferably has a degree of elasticity similar to that of the interlayer 4. Relative movement between the mounting section 3 and the interlayer 4 is therefore minimised, and that reduces the possibility of delamination.
2. The use of fusion welding to unite the interlayer 4 and the working section 2 resists separation of the interlayer 4 and the working section 2 when the working section 2 is being stretched or otherwise forcibly distorted.
3. When the product is being applied to a rigid support, such as a vehicle door frame, the tape/interlayer composite 3,4 enables that composite to resist stretching because of its relatively low level of elasticity. As a result, the bond between the two parts of the composite remains substantially stress free after completion of the installation process.

The product 1 is ideally suited for applications in which the product is adhered directly to a support, such as a vehicle door or door frame. It will be appreciated that when used as a vehicle door seal (for example) the product is able to be conveniently and rapidly attached to its support. Other benefits will be apparent from the preceding description of the product and its method of manufacture.

Various alterations, modifications and/or additions may be introduced into the constructions and arrangements of parts previously described without departing from the spirit or ambit of the invention as defined by the appended claims.

The invention claimed is:

1. A resilient product including a working section formed of a relatively soft thermoplastic elastomeric material, a mounting section having an adhesive surface for securing the working section to a support, and an interlayer being an independent component from the mounting section and the working section and being formed of a relatively hard polymer interposed between the working section and the mounting section and being secured to both said working section and said mounting section, wherein the interlayer is secured to the working section by fusion welding, and the mounting section is attached to the interlayer by adhesion.

2. A resilient product according to claim 1, wherein the interlayer and the working section are in sheet or strip form.

3. A resilient product according to claim 2, wherein the mounting section is in sheet or strip form.

4. A resilient product according to claim 1, wherein the product is in layered form such that the interlayer shields a face of the mounting section from the influence of movement occurring in the working section caused by compression or stretching of the working section.

5. A resilient product according to claim 1, wherein the interlayer is polypropylene.

6. A resilient product according to claim 1, wherein the relatively soft elastomeric material has a hardness in the range of Shore A5 to A90.

7. A resilient product according to claim 1, wherein the relatively hard polymer has a hardness in the range of Rockwell R80 to R150.

8. A resilient product according to claim 1, further including a cap section associated with the working section, the cap section being harder than the working section.

9. A resilient product according to claim 8, wherein the cap section is formed integrally with the working section by treating a portion of the working section remote from the interlayer to transform that portion into the relatively hard cap section.

10. A resilient product according to claim 9, wherein the cap section and working section are co-extruded.

11. A resilient product according to claim 9, wherein the working section is treated to gradually increase in relative hardness between the relatively soft working section and the relatively hard cap section.

12. A resilient product according to claim 9, wherein the hardness of the cap section is substantially constant throughout the treated portion of the working section.

13. A resilient product according to claim 8, wherein the cap section is formed separately from the working section and is secured thereto by fusion or welding.

14. A resilient product according to claim 13, wherein the cap section is formed from polypropylene, rigid PVC or another rigid thermoplastic.

15. A resilient product according to claim 13, wherein the cap section has a hardness greater than Rockwell R80.

16. A dust or weather seal including a resilient product according to claim 1.

17. A dust or weather seal according to claim 16, secured by said adhesive surface to a vehicle door or a vehicle door frame.

18. A resilient mounting member including a resilient product according to claim 1.

19. A resilient product according to claim 1, wherein the interlayer is polyvinylchloride.

20. A resilient product according to claim 1, wherein the interlayer has a thickness in the range of 0.3 millimeters to 2.0 millimeters inclusive.

21. A method of producing a resilient product including the following steps:
    bringing an adhesive surface of a mounting section into engagement with one surface of a relatively hard interlayer,
    securing the mounting section to the interlayer by adhesion,
    applying a compressional force to said mounting section interlayer composite,
    feeding the mounting section interlayer composite into the path of molten material intended to form a relatively soft working section, and
    fusing the working section to an opposed surface of the interlayer.

22. A method according to claim 21, further including treating said one surface of the interlayer to promote adhesion.

23. A method according to claim 22, wherein said treatment of said one surface involves treatment by corona discharge, etching, blue flame or chemical treatment to promote adhesion.

24. A method according to claim 21, wherein the compressional force is created by storing the mounting section interlayer composite on a spool under tension for a predetermined period of time.

25. A method according to claim 21, further including passing the mounting section-interlayer-working section composite through a cooling station to set a profile of the working section.

26. A resilient product produced by the method of claim 21.

27. A resilient product adapted to seal a vehicle door to a vehicle body, the resilient product comprising:
- a working section formed of a relatively soft elastomeric material;
- a mounting section having an adhesive for securing the working section to a support; and
- an interlayer formed of a relatively hard material interposed between the working section and the mounting section and being further secured to both said working section and said mounting section, the interlayer being fusion welded to the working section.

\* \* \* \* \*

UNITED STATES PATENT AND TRADEMARK OFFICE
CERTIFICATE OF CORRECTION

PATENT NO. : 7,611,769 B2
APPLICATION NO. : 10/487585
DATED : November 3, 2009
INVENTOR(S) : Mills et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Twelfth Day of October, 2010

David J. Kappos
*Director of the United States Patent and Trademark Office*